(12) United States Patent
Milazzo et al.

(10) Patent No.: US 7,926,775 B1
(45) Date of Patent: Apr. 19, 2011

(54) TREE STAND BRACKET APPARATUS

(76) Inventors: David Milazzo, Middle Island, NY (US); Thomas F. Carbo, Middle Island, NY (US)

( * ) Notice: Subject to any disclaimer, the term of this patent is extended or adjusted under 35 U.S.C. 154(b) by 0 days.

(21) Appl. No.: 12/630,360

(22) Filed: Dec. 3, 2009

(51) Int. Cl.
*A47B 96/00* (2006.01)
(52) U.S. Cl. ................................... 248/230.8
(58) Field of Classification Search ............... 248/230.1, 248/230.8, 219.4, 332; 182/133, 187, 188; 379/454, 453
See application file for complete search history.

(56) References Cited

U.S. PATENT DOCUMENTS

| | | | |
|---|---|---|---|
| D270,474 S | 9/1983 | Haines et al. | |
| 5,199,527 A | 4/1993 | Jennings | |
| 5,562,180 A | 10/1996 | Herzog et al. | |
| 6,065,722 A | 5/2000 | LeVasseur et al. | |
| 6,185,303 B1 | 2/2001 | Losey | |
| 6,386,321 B1 * | 5/2002 | Muhich | 182/187 |
| 6,397,973 B1 * | 6/2002 | Woller | 182/187 |
| 6,508,446 B1 * | 1/2003 | Addison et al. | 248/218.4 |
| 6,715,585 B1 * | 4/2004 | Overbaugh | 182/187 |
| 7,296,658 B1 | 11/2007 | Pederson | |
| 2007/0095614 A1 * | 5/2007 | Mannor | 182/187 |
| 2008/0169155 A1 * | 7/2008 | Broberg | 182/187 |
| 2010/0065371 A1 * | 3/2010 | Glenn | 182/187 |

* cited by examiner

*Primary Examiner* — Ramon O Ramirez
(74) *Attorney, Agent, or Firm* — Crossley Patent Law; Mark A. Crossley

(57) ABSTRACT

The tree stand bracket apparatus fits a plurality of various trees as well as tree stands. The concavities of the mounts importantly fit the curvature of a tree so that the apparatus can easily be securely and selectively affixed to the tree. The removable straps provide for securement to a tree as well as portable securement to a tree stand. Hollow side members further ensure light weight and portability that aid in transport and use. The combined crosspieces and mounts increase the strength of the apparatus. The pulley and the cable loop provide more than one way to aid in lifting and lowering the apparatus and tree stands. Each of the features of the apparatus importantly provides strength, tree stand applicability, and light weight.

15 Claims, 5 Drawing Sheets

US 7,926,775 B1

TREE STAND BRACKET APPARATUS

BACKGROUND OF THE INVENTION

Tree stands have been widely used for many years for hunting, observation and work. Tree stands are temporarily and permanently mounted in trees, often high above ground. Elevating a tree stand to the desired altitude on a tree is often quite difficult, though, as is securing and lowering a tree stand. The present apparatus solves the problems involved in mounting, hoisting, and lowering a variety of tree stands.

FIELD OF THE INVENTION

The tree stand bracket apparatus relates to tree stands and more especially to a bracket apparatus for mounting, hoisting, and lowering tree stands, and can also be used in conjunction with other similar hoisting, mounting, and other applications and tasks unrelated to hunting.

SUMMARY OF THE INVENTION

The general purpose of the tree stand bracket apparatus, described subsequently in greater detail, is to provide a tree stand bracket apparatus which has many novel features that result in an improved tree stand bracket apparatus which is not anticipated, rendered obvious, suggested, or even implied by prior art, either alone or in combination thereof.

To attain this, the tree stand bracket apparatus fits a plurality of various trees as well as tree stands. The side members of the apparatus slideably fit within many tree stands. Various width dimensions of the apparatus are available. The concavities of the mounts importantly fit the curvature of a tree so that the apparatus can easily be securely and selectively affixed to the tree. The removable straps are provided in variety of makeups, including elastic and adjustably tightened straps. Laterally disposed mount holes ease strap installation and removal. The apparatus is available in metal, alloys, composites, and plasticized materials. As the side members are optionally hollow, the apparatus provides a lightweight portability that aids in transport and use. The combined crosspieces and mounts increase the strength of the apparatus The pulley and the cable loop provide more than one way to aid in lifting and lowering the apparatus, with the cable loop being less expensive in sale and production. Both loop and pulley can be used to anchor the apparatus to a tree or other object. Each of the features of the apparatus importantly provides strength, tree stand applicability, and light weight. Ideally, the apparatus is importantly about 11 inches high and about 9½ inches wide. The size of the apparatus is critical in that a larger and heavier apparatus could hamper if not negate portability, especially since portable tree stands are often carried in conjunction with the apparatus. The apparatus is therefore adapted to receive and carry a portable tree stand, such as in a back pack mode.

While the concept and design is for use primarily with a tree stand bracket apparatus system, it is not restricted exclusively to use with tree stands, as the present bracket apparatus can be used in a wide variety of applications, tasks and other practical situations.

Thus has been broadly outlined the more important features of the improved tree stand bracket apparatus so that the detailed description thereof that follows may be better understood and in order that the present contribution to the art may be better appreciated.

An object of the tree stand bracket apparatus is to elevate a tree stand up a tree.

Another object of the tree stand bracket apparatus is to lower a tree stand from a height in a tree.

A further object of the tree stand bracket apparatus is to removably secure a tree stand to a tree.

An added object of the tree stand bracket apparatus is to elevate, lower, and retain a plurality of various tree stand types.

Another object of the tree stand bracket apparatus is to insure ease of portability.

Yet another object of the tree stand bracket apparatus is to provide for combining mobility with a tree stand attached.

These together with additional objects, features and advantages of the improved tree stand bracket apparatus will be readily apparent to those of ordinary skill in the art upon reading the following detailed description of presently preferred, but nonetheless illustrative, embodiments of the improved tree stand bracket apparatus when taken in conjunction with the accompanying drawings.

In this respect, before explaining the current embodiments of the improved tree stand bracket apparatus in detail, it is to be understood that the tree stand bracket apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved tree stand bracket apparatus. It is therefore important that the claims be regarded as including such equivalent constructions insofar as they do not depart from the spirit and scope of the tree stand bracket apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 6 thereof, the principles and concepts of the tree stand bracket apparatus generally designated by the reference number 10 will be described.

Figure 5:
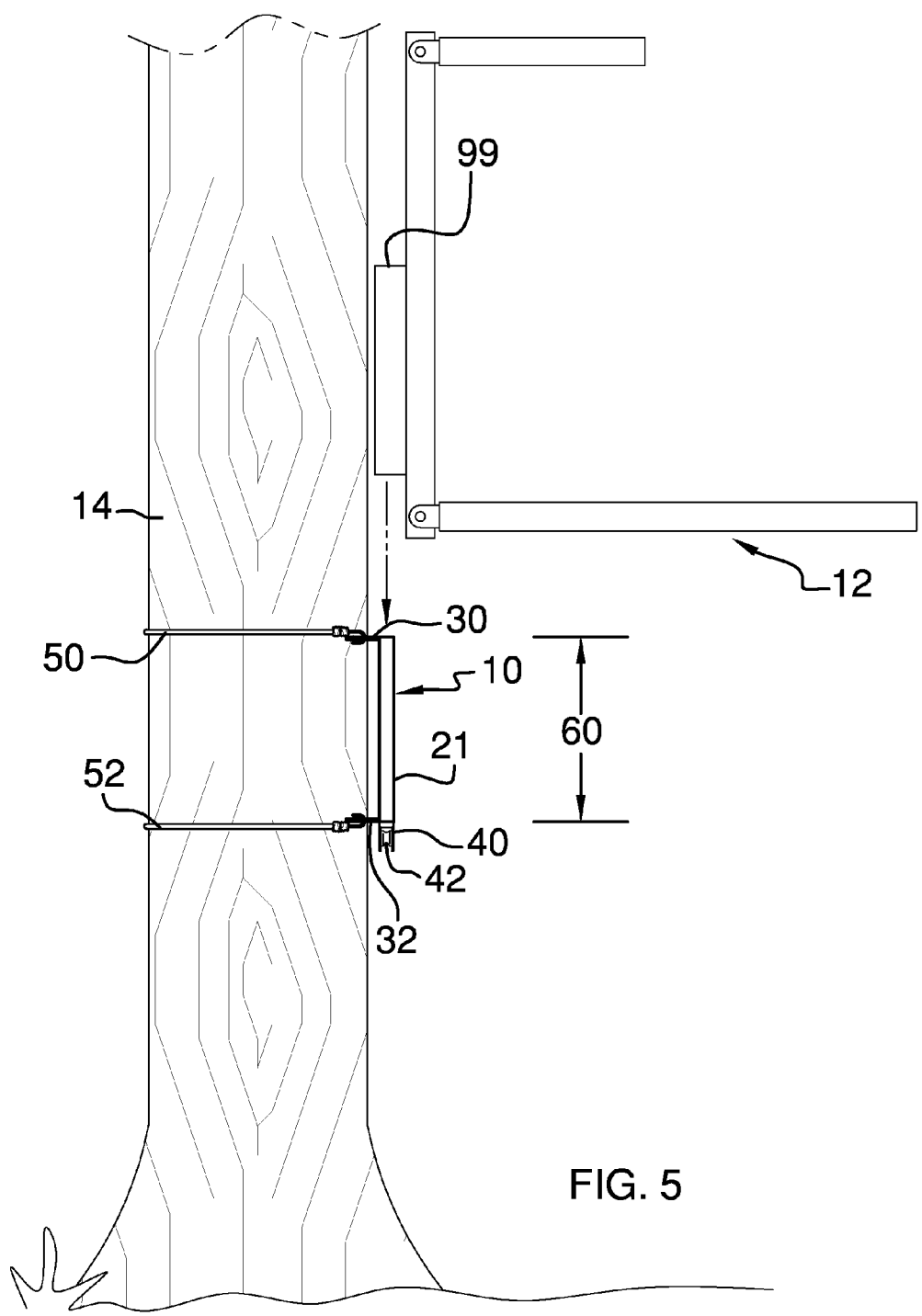
FIG. 5 is a lateral elevation view of the apparatus affixed to a tree with tree stand disposed above the apparatus.

Referring to FIG. 5, the apparatus 10 provides for hoisting and lowering an existing tree stand 12 into and from a height on the tree 14.

Figure 3:
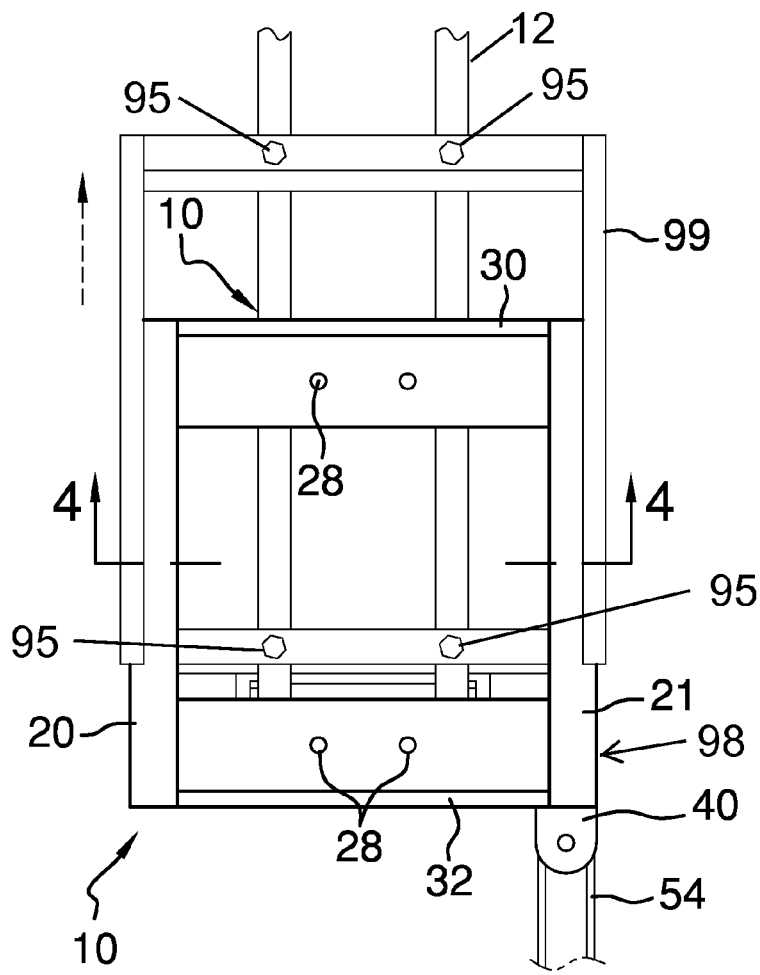
FIG. 3 is an front elevation view, with tree stand slideably affixed.

Referring to FIG. 3 and FIG. 5, the apparatus 10 also provides for holding a tree stand 12 to a tree 14. The apparatus 10 provides for hoisting and lowering an existing tree stand 12 to and from a height on the tree 14 via a cable 54. The cable 54 is provided in various makeups, including but not limited to rope and steel.

Figure 1:
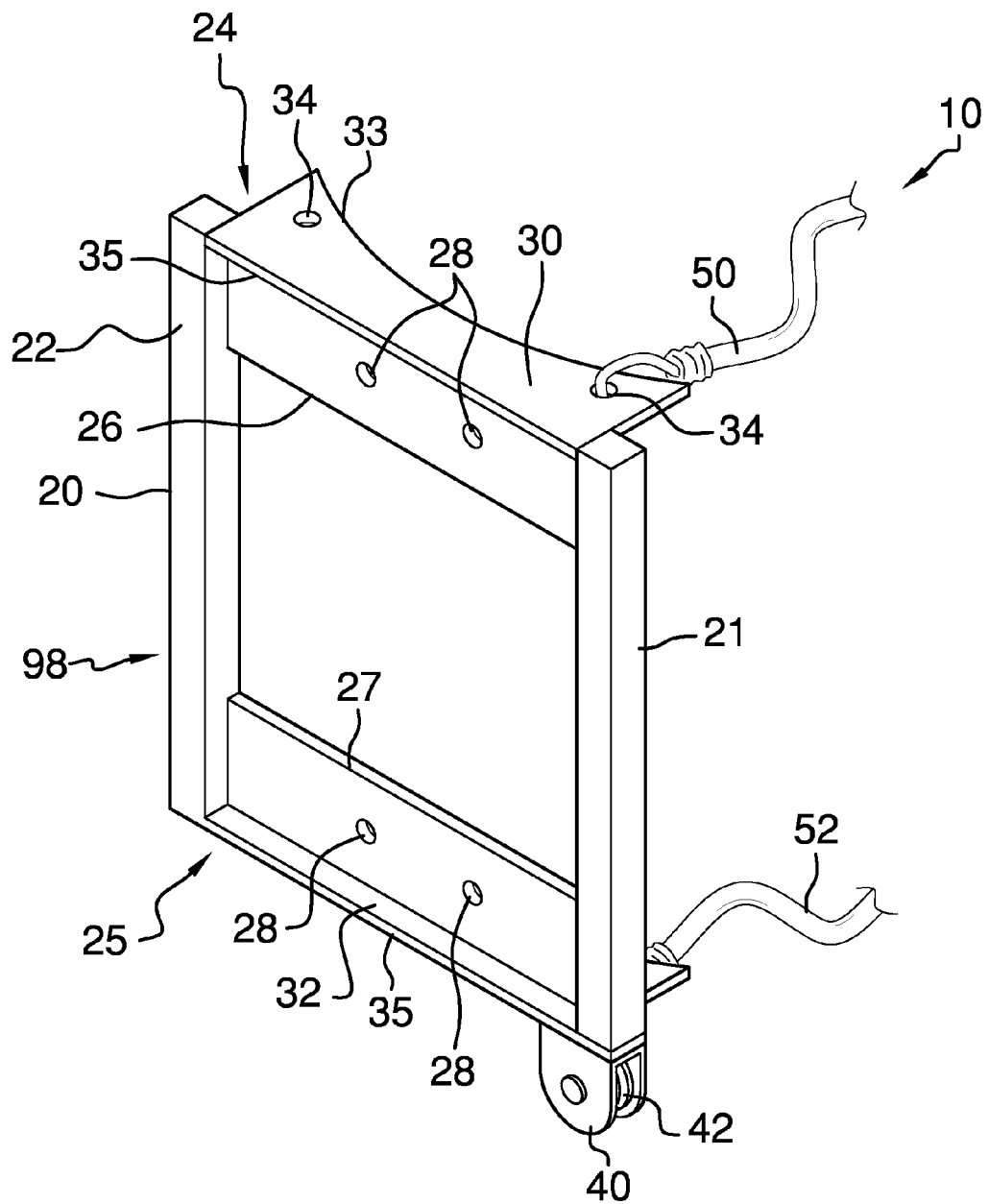
FIG. 1 is an front perspective view.
Figure 2:
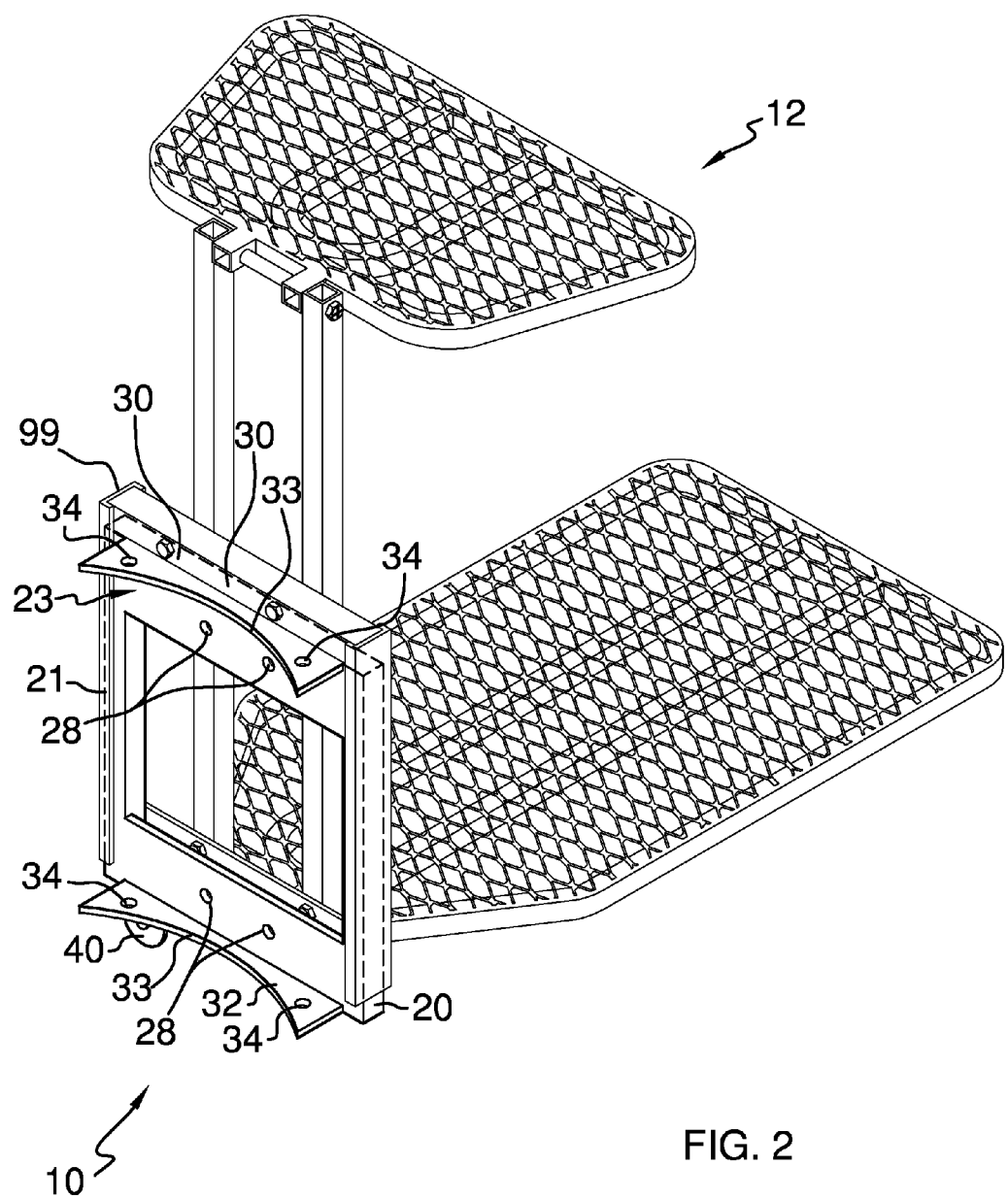
FIG. 2 is a back perspective view.

Referring to FIGS. 1 and 2, the tree stand apparatus 10 comprises an outer mounting bracket 99 and an inner mounting bracket 98 further comprising a front 22 spaced apart from a back 23 and a top 24 spaced apart from a bottom 25. The hollow rectangular vertical first side member 20 is spaced apart from the hollow rectangular vertical second side member 21. The outer mounting bracket 99 slidably engages the inner mounting bracket 98. The outer mounting bracket 99 is secured to a tree stand 12 by a plurality of bolts 95.

The rectangular upper crosspiece 26 is horizontally disposed proximal to the top 24 between the first side member 20 and the second side member 21. The upper crosspiece 26 is perpendicular to the first side member 20 and the second side member 21. The rectangular lower crosspiece 27 is disposed proximal to the bottom 25 between the first side member 20 and the second side member 21. The lower crosspiece 27 is perpendicular to the first side member 20 and the second side member 21. The pair of spaced apart crosspiece orifices 28 is disposed in each crosspiece. The plano-concave top mount 30 is horizontally disposed at the top 24. The top mount 30 is affixed above the upper crosspiece 26 and between the first side member 20 and the second side member 21. The outer surface 35 of the top mount 30 is coplanar with the front 22. The plano-concave bottom mount 32 is horizontally disposed at the bottom 25. The bottom mount 32 is affixed below the lower crosspiece 27 between the first side member 20 and the second side member 21. The outer surface 35 of the bottom mount 32 is coplanar with the front 22.

Figure 4:
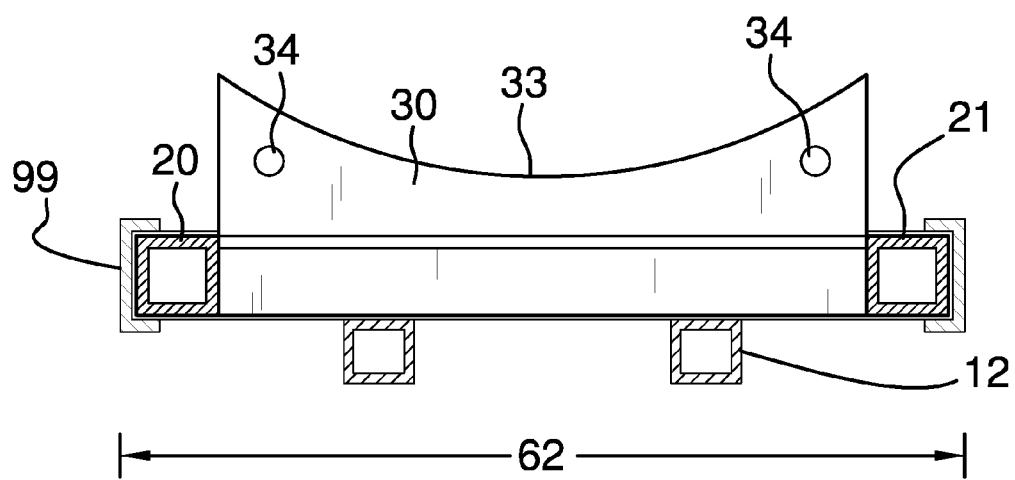
FIG. 4 is a cross sectional elevation view of FIG. 3, taken along the line 4-4.

Continuing to refer to FIGS. 1 and 2 and referring also to FIG. 4, the concavity 33 is disposed on each plano-concave mount. Each concavity 33 is extended beyond the back 23. The concavities 33 are importantly parallel so that tree 14 mount of the apparatus 10 provides vertical or near vertical positioning of the apparatus 10. Each of the pair of spaced apart mount holes 34 is disposed laterally outward in each mount. The u-shaped pulley mount 40 is disposed on the bottom 25 of the bottom mount 32. The pulley mount 40 is disposed below the second side member 21. The pulley 42 is rotationally and vertically disposed within the u-shaped pulley mount 40.

Figure 6:
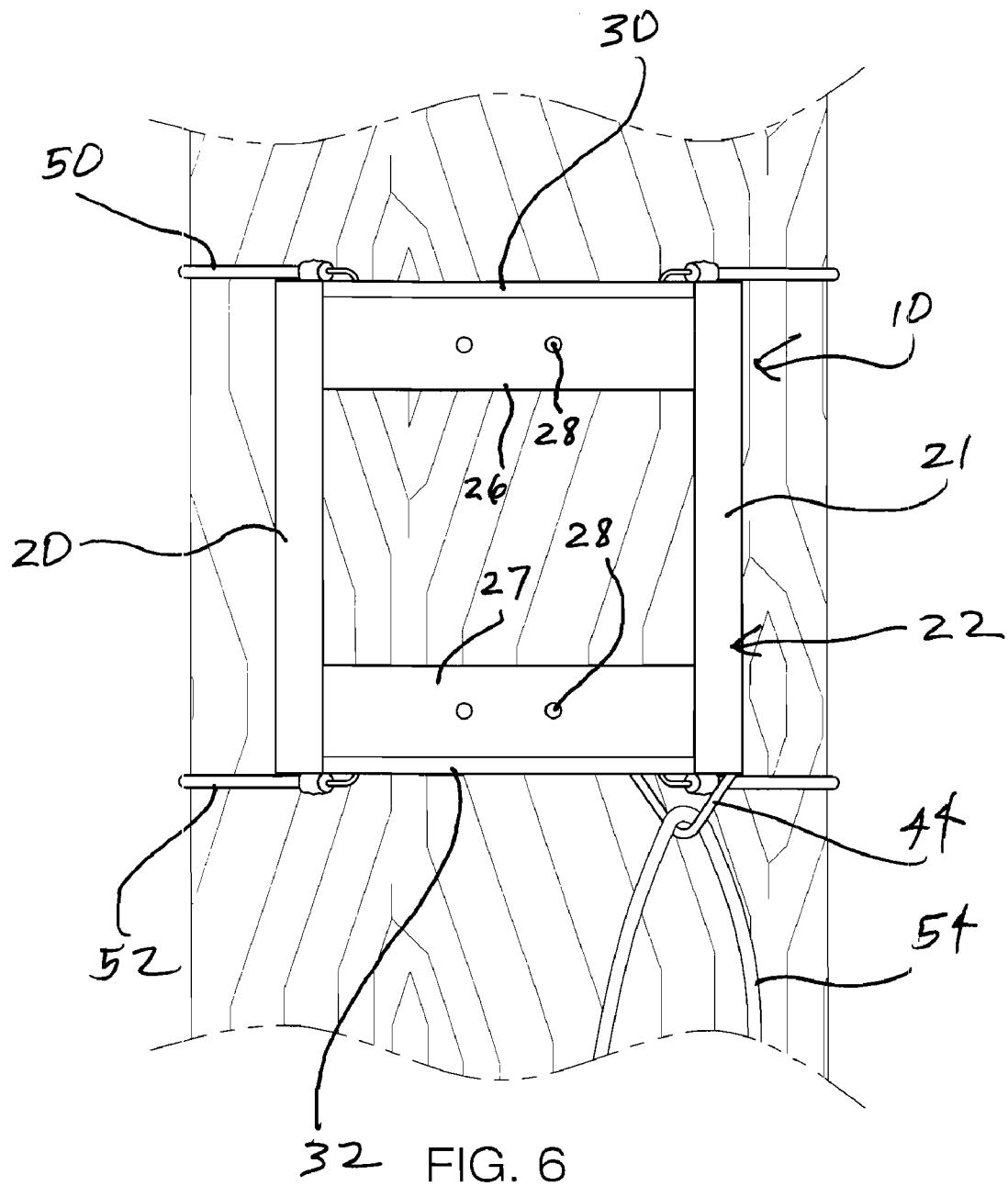
FIG. 6 is a front elevation view of the apparatus affixed to a tree via the straps.

Referring to FIG. 6, the first strap 50 is removably disposed in each of the top mount 30 mount holes 34. The second strap 52 is removably disposed in each of the bottom mount 32 mount holes 34. The straps removably encircle a tree 14 to selectively retain the apparatus 10 to the tree 14. The cable loop 44 is substituted for the pulley mount 40 and pulley 42.

Referring to FIGS. 4 and 5, the apparatus 10 importantly has a height 60 of about 11 inches and a width 62 of about 9½ inches.

With respect to the above description then, it is to be realized that the optimum dimensional relationships for the parts of the tree stand bracket apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the tree stand bracket apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the tree stand bracket apparatus may be used.

Therefore, the foregoing is considered as illustrative only of the principles of the tree stand bracket apparatus. Further, since numerous modifications and changes will readily occur to those skilled in the art, it is not desired to limit the tree stand bracket apparatus to the exact construction and operation shown and described, and accordingly, all suitable modifications and equivalents may be resorted to, falling within the scope of the tree stand bracket apparatus.

What is claimed is:

1. A bracket apparatus comprising, in combination:
an outer mounting bracket;
an inner mounting bracket having a front spaced apart from a back, a top spaced apart from a bottom;
a rectangular vertical first side member spaced apart from a rectangular vertical second side member;
a rectangular upper crosspiece horizontally disposed proximal to the top between the first side member and the second side member, the upper crosspiece perpendicular to the first side member and the second side member;
a rectangular lower crosspiece disposed proximal to the bottom between the first side member and the second side member, the lower crosspiece perpendicular to the first side member and the second side member;
a pair of spaced apart crosspiece orifices disposed in each crosspiece;
a top mount horizontally disposed at the top, the top mount affixed above the upper crosspiece and between the first side member and the second side member;
a bottom mount horizontally disposed at the bottom, the bottom mount affixed below the lower crosspiece between the first side member and the second side member;
a pair of spaced apart mount holes, each of the mount holes disposed laterally outward in each mount;
a u-shaped pulley mount disposed on the bottom of the bottom mount, the pulley mount disposed below the second side member;
a pulley rotationally and vertically disposed within the u-shaped pulley mount;
a first strap removably disposed in each of the top mount holes;
a second strap removably disposed in each of the bottom mount holes.

2. The apparatus according to claim 1 wherein the rectangular vertical first side member and the rectangular vertical second side member are further hollow.

3. The apparatus according to claim 2 wherein an outer surface of the top mount and an outer surface of the bottom mount are further coplanar with the front.

4. The apparatus according to claim 3 further comprising a height of about 11 and a width of about 9½ inches.

5. The apparatus according to claim 1 wherein an outer surface of the top mount and an outer surface of the bottom mount are further coplanar with the front.

6. A bracket apparatus comprising, in combination:
an outer mounting bracket;
an inner mounting bracket having a front spaced apart from a back, a top spaced apart from a bottom;
a rectangular vertical first side member spaced apart from a rectangular vertical second side member;
a rectangular upper crosspiece horizontally disposed proximal to the top between the first side member and the second side member, the upper crosspiece perpendicular to the first side member and the second side member;
a rectangular lower crosspiece disposed proximal to the bottom between the first side member and the second side member, the lower crosspiece perpendicular to the first side member and the second side member;
a pair of spaced apart crosspiece orifices disposed in each crosspiece;

a plano-concave top mount horizontally disposed at the top, the top mount affixed above the upper crosspiece and between the first side member and the second side member;
a plano-concave bottom mount horizontally disposed at the bottom, the bottom mount affixed below the lower crosspiece between the first side member and the second side member;
a concavity disposed on each plano-concave mount, each concavity extended beyond the back, the concavities parallel;
a pair of spaced apart mount holes, each of the mount holes disposed laterally outward in each mount;
a u-shaped pulley mount disposed on the bottom of the bottom mount, the pulley mount disposed below the second side member;
a pulley rotationally and vertically disposed within the u-shaped pulley mount;
a first strap removably disposed in each of the top mount holes;
a second strap removably disposed in each of the bottom mount holes.

7. The apparatus according to claim 6 wherein the rectangular vertical first side member and the rectangular vertical second side member are further hollow.

8. The apparatus according to claim 7 wherein an outer surface of the top mount and an outer surface of the bottom mount are further coplanar with the front.

9. The apparatus according to claim 8 further comprising a height of about 11 and a width of about 9½ inches.

10. The apparatus according to claim 6 wherein an outer surface of the top mount and an outer surface of the bottom mount are further coplanar with the front.

11. A bracket apparatus comprising, in combination:
an outer mounting bracket;
an inner mounting bracket having a front spaced apart from a back, a top spaced apart from a bottom;
a rectangular vertical first side member spaced apart from a rectangular vertical second side member;
a rectangular upper crosspiece horizontally disposed proximal to the top between the first side member and the second side member, the upper crosspiece perpendicular to the first side member and the second side member;
a rectangular lower crosspiece disposed proximal to the bottom between the first side member and the second side member, the lower crosspiece perpendicular to the first side member and the second side member;
a pair of spaced apart crosspiece orifices disposed in each crosspiece;
a plano-concave top mount horizontally disposed at the top, the top mount affixed above the upper crosspiece and between the first side member and the second side member;
a plano-concave bottom mount horizontally disposed at the bottom, the bottom mount affixed below the lower crosspiece between the first side member and the second side member;
a concavity disposed on each plano-concave mount, each concavity extended beyond the back, the concavities parallel;
a pair of spaced apart mount holes, each of the mount holes disposed laterally outward in each mount;
a v-shaped cable loop disposed downwardly from the bottom and the second side member;
a first strap removably disposed in each of the top mount holes;
a second strap removably disposed in each of the bottom mount holes.

12. The apparatus according to claim 11 wherein the rectangular vertical first side member and the rectangular vertical second side member are further hollow.

13. The apparatus according to claim 12 wherein an outer surface of the top mount and an outer surface of the bottom mount are further coplanar with the front.

14. The apparatus according to claim 13 further comprising a height of about 11 and a width of about 9½ inches.

15. The apparatus according to claim 11 wherein an outer surface of the top mount and an outer surface of the bottom mount are further coplanar with the front.

* * * * *